United States Patent [19]

Baker

[11] 4,275,671
[45] Jun. 30, 1981

[54] SEED SOWING IMPLEMENTS

[76] Inventor: Christopher J. Baker, Bunnythorpe, R.D., Feilding, New Zealand

[21] Appl. No.: 140,016

[22] Filed: Apr. 14, 1980

Related U.S. Application Data

[63] Continuation of Ser. No. 927,997, Jul. 26, 1978, abandoned.

[30] Foreign Application Priority Data

Jul. 26, 1977 [NZ] New Zealand .................. 184742

[51] Int. Cl.³ .................................................. A01C 5/00
[52] U.S. Cl. ........................................ 111/85; 111/87; 172/157
[58] Field of Search .................. 111/85, 86, 87, 77; 172/157, 518, 527, 528, 558, 561, 562, 604, 524, 547

[56] References Cited

U.S. PATENT DOCUMENTS

| 607,964 | 7/1898 | Stamper | 172/157 |
| 687,953 | 12/1901 | Desjardins | 111/87 |
| 736,369 | 8/1903 | Dynes et al. | 172/561 X |
| 892,967 | 7/1908 | Thomas | 111/87 X |
| 1,041,166 | 10/1912 | Roby et al. | 111/87 |
| 1,234,372 | 7/1917 | Miller | 111/87 |
| 1,873,128 | 8/1932 | Johnson | 111/87 |
| 2,001,003 | 5/1935 | Tuft | 111/86 |
| 2,445,698 | 7/1948 | Siebring | 111/77 |
| 2,620,714 | 12/1952 | Baldwin | 172/561 X |
| 2,842,078 | 7/1958 | Immesoete | 111/87 X |
| 2,917,012 | 12/1959 | Oehler et al. | 172/558 X |
| 3,504,646 | 4/1970 | Trahms | 111/87 |

FOREIGN PATENT DOCUMENTS

| 2006052 | 12/1977 | Fed. Rep. of Germany | 111/87 |
| 42370 | 7/1933 | France | 111/85 |
| 2236402 | 1/1975 | France | 111/85 |
| 291300 | 12/1931 | Italy | 172/157 |
| 1098018 | 1/1968 | United Kingdom | 111/87 |
| 446118 | 12/1974 | U.S.S.R. | 111/85 |
| 579956 | 10/1977 | U.S.S.R. | 111/87 |

Primary Examiner—James R. Feyrer
Attorney, Agent, or Firm—Scully, Scott, Murphy & Presser

[57] ABSTRACT

The invention provides a seed sowing coulter implement comprising a vertical cutting blade in the form of a rotatable disc disposed in the line of travel and having a peripheral cutting edge part arranged to penetrate and slit the ground as the implement is moved along, a pair of detachably mounted coulter tip part disposed adjacent one side of the blade for location and operation solely below ground level, means for determining the depth of cut of the blade and location of the coulter tip parts below ground level, and a seed duct member provided in juxtaposition with the blade and a support for the coulter tip parts and arranged to feed seeds from a supply source into a passage formed by the coulter tip parts at a point close to such part and behind the leading edges thereof.

9 Claims, 4 Drawing Figures

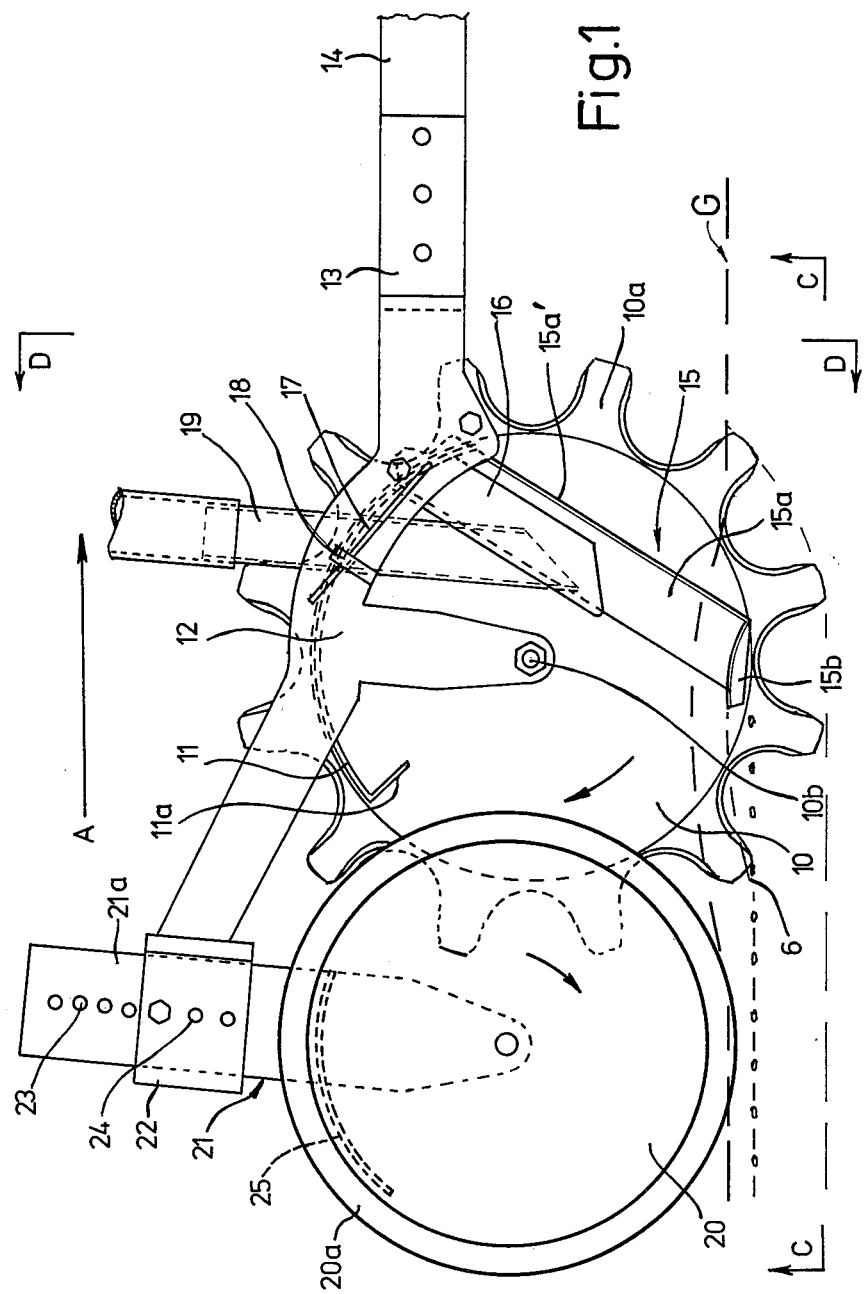

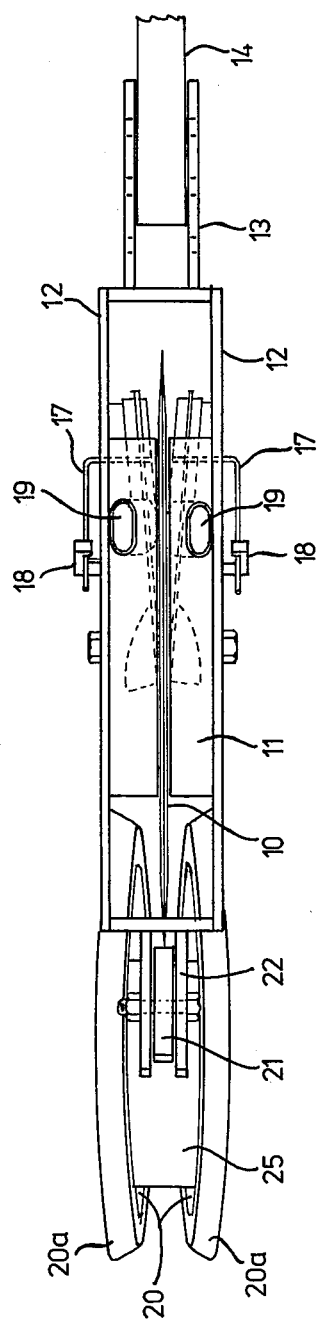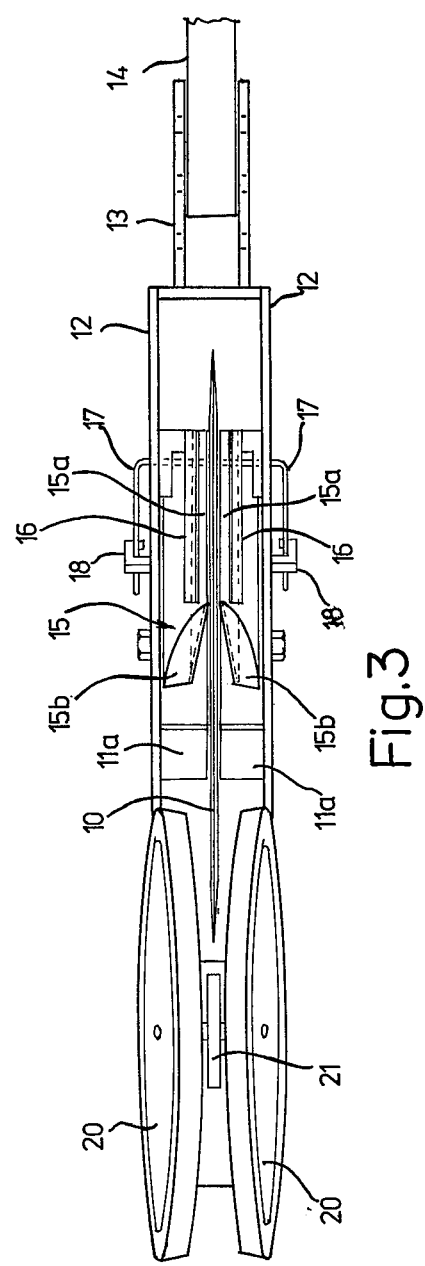

SEED SOWING IMPLEMENTS

This is a continuation of application Ser. No. 927,997, filed July 26, 1978, now abandoned.

This invention relates to seed sowing implements which are arranged to be mounted on or attached to a farm vehicle or further implement to be carried, pushed or towed along in forming a furrow or channel into which seeds may be dropped.

An object of this invention is to provide an improved seed sowing implement facilitating and speeding the sowing of seeds by enabling sowing to be effected without the need for prior cultivation and to be carried out in a variety of soil conditions.

Another object of the invention is to provide a seed sowing implement which is arranged to provide a seed receiving furrow or passage below ground level with a minimum of disturbance of the ground surface whilst providing a passage from which trash or vegetation has been cleared or deflected in permitting freedom of seed growth.

Other and more particular objects and advantages of the invention will become apparent from the ensuing description.

According to this invention therefore, there is provided a seed sowing implement comprising a circular rotatable cutting blade mounted for rotation about a horizontal axis and in a substantially vertical plane extending in the direction of intended travel of the blade and having a peripheral vertically disposed and substantially flat cutting edge part arranged in use to penetrate and form a vertical slit in the ground as the implement is moved forwardly along a coulter support mounted in juxtaposition with said blade, a pair of coulter tip parts mounted on said support on each side of said peripheral cutting edge part for location and operation solely below ground level and disposed with at least their leading edge portions in sliding contact with or in close proximity to one side of said blade peripheral cutting edge part and at a point below the axis of rotation of the cutting blade and above the lowest point of the cutting edge, said coulter tip parts each having a sharp leading edge and a broad trailing formation projecting laterally of the line of cut of the blade so that both tip parts form a common broad passage extending both sides of the ground slit and below the ground level as the implement is moved forwardly, means for determining the depth of cut of the blade and location of the coulter tip parts below ground level, and a seed duct member provided in juxtaposition with the coulter support and arranged to feed seeds from a supply source into the passage at a point close to the coulter tip parts behind the leading edge portion thereof.

Some preferred aspects of the invention will now be described by way of example and with reference to the accompanying drawings, in which:

FIG. 1 is a diagrammatic side elevational view of one form of the invention,

FIG. 2 is a plan view of the arrangement shown in FIG. 1,

FIG. 3 is an inverted plan view (in the direction of arrows C—C) of the arrangement shown in FIG. 1.

Figure 4:
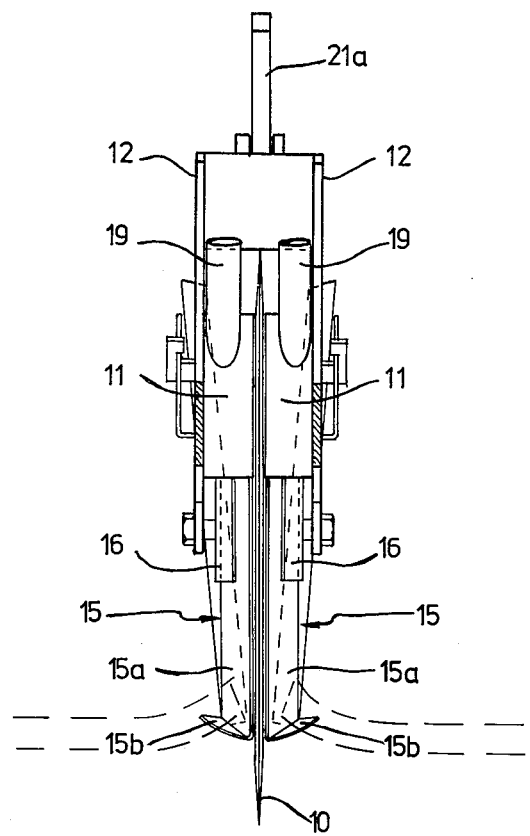
FIG. 4 is a front end view (in the direction of arrows D—D) of the arrangement shown in FIG. 1.

Referring now to FIGS. 1, 2, 3 and 4 of the drawings in which preferred embodiments of the invention are shown, the cutting blade is in the form of a freely rotatable cutting disc 10 with a sharp peripheral part of deeply scalloped or toothed formation 10a facilitating ground trash (e.g. unwanted growth, dead vegetation, stubble etc.) penetration, cutting and/or deflection, the disc 10 being mounted for rotation as before in a vertical plane extending in the line of travel A of the implement and about a horizontal transverse axis 10b. The disc 10 can be supported between the forward end parts of two support frame members 12 extending in spaced relationship longitudinally of the implement, with each member being provided with an arcuate (in side elevation) inwardly directed upper flange part 11 having its inner peripheral edge terminating close to the respective side of the disc 10 near the scalloped peripheral part thereof.

The frame members 12 are conjoined at their forward and rearward end parts and the forward end part includes a bracket 13 connected or connectable to a draw bar 14 for the towing vehicle; the connection between the forward bracket 13 and draw bar 14 and/or between the draw bar and towing vehicle can be a pivoted connection permitting vertical and/or horizontal movement of the implement relative to the towing vehicle. A further inwardly directed flange part 11a may be provided at the lower rearward side of each flange part 11 to terminate adjacent or close to the disc 10 and serve as a scraper to assist in maintaining the disc clear of mud or dirt adhering thereto.

Coulter members (generally indicated by the arrow 15) for this construction can be of simple separate fabricated sheet or strip metal form, each of substantially L-shape when viewed from the front or rear with a long leg 15a extending upwardly adjacent the disc 10 for detachable connection to its respective support and with a short leg 15b forming the seed passage cutting coulter tip part extending laterally from the lower end of the long leg 15a and relative to the lower part of the disc 10. The short leg 15b or coulter tip part has a sharpened leading edge and may take the form generally illustrated in FIGS. 1-4 with the leading edge angled rearwardly from its junction with the long leg 15a and the short leg 15b as a whole inclined and/or turned upwardly and rearwardly to provide a clear open seed passage as it is moved along under the ground. The coulter tip part is located above the lower point of the disc periphery so that the disc penetration extends below the passage 6. At least the lower part of the long leg 15a (and preferably the full leading edge 15a thereof) of each coulter member 15 is arranged to be located in sliding or scraping contact with the respective side of the disc 10 for location in the ground slit formed by such disc 10. The leading edge 15a' of the long leg 15a can be sharpened and the sliding or scraping contact with the disc 10 will prevent trash locating and binding between the disc 10 and the coulter members 15, and will maintain the disc 10 clean of dirt to facilitate continued efficient and clean cutting or penetration of the earth and trash in the path of the disc 10.

To provide detachable engagement and mounting of each coulter tip part 15, the upper portion of each long leg 15a can locate in a suitably formed socket arrangement 16 at or near the forward end part of each support frame member 12 and for ease of securement and detachment an inner end part of such as a pin or bolt member 17 can be locatable through aligned apertures in the socket arrangement 16 and upper portion of the coulter tip part 15 located therein, and a bent outer end part of the pin or bolt member 17 can be sprung or latched under a hooked retained lug 18 on the socket arrangement. More than one aperture can be provided in the upper portion of each coulter tip part 15 to provide for adjustment in height of such parts 15 relative to the lowest point and depth of cut of the disc 10. The coulter tip parts 15 can be otherwise pinned or alternatively screwed or bolted in position. In the illustrated form the coulter tip parts 15 are mounted in the forwardly positioned socket arrangements 16 and are inclined rearwardly and splayed out outwardly so that the lower parts forward or leading edges 15a' and tip points are located adjacent disc sides with the tips near the lowest point of the disc within the unscalloped area adjacent the scalloped peripheral part 10a.

Preferably the socket arrangement 16 and coulter tip part 15 fitment provide for a limited amount of lateral movement of the coulter tip part 15 relative to the disc 10 and thus as the implement is moved along and by virtue of the angled or splayed arrangement of the coulter tip parts 15, the leading edges of the long leg parts 15a are continually urged into sliding contact with the disc sides in maintaining the disc clean for efficient cutting and without build-up or binding of soil or trash.

Two tubular members 19 forming seed and fertiliser ducts can be provided, one either side of the disc 10 and located through apertures provided in the upper flange parts 11 of the support frame members 12 to have lower outlet ends located between the respective sides of the disc 10 and the adjacent long legs 15a of the respective coulter tip parts 15, or immediately behind said coulter tip parts 15, to guide seeds and fertiliser into the formed seed passage 6.

Closing of the ground slit cut by the disc 10 and partial compacting of the ground over the sown seed is preferably effected by a trailing compacting wheel or a pair of wheels substantially aligned with the disc 10 and mounted for rotation about substantially a horizontal transverse axis in or a wheel mounting at or towards the rear end parts of the support frame members 12. The illustrated arrangement shows a pair of compacting wheels 20 mounted for rotation on a wheel mounting 21 so as to be inclined relative to the vertical plane aligned with the cutting disc 10 with one wheel 20 either side of such plane and the two wheels closer at their lower sides than at their upper sides to urge the ground slit closed.

The provision of the pair of compacting wheels 20 or 'split' wheel arrangement enables an overlapping of the wheel and cutting blade peripherals in providing a compact seed sowing assembly. Additionally the overlapping at close proximity of the peripheral parts of the compacting wheels 20 and the blade 10, and the relative opposite directions of rotation of the overlapping parts, assists in preventing build-up of soil and/or trash on the wheels 20 and blade 10.

The compacting wheels 20 can also serve to determine the depth of cut of the disc 10 and relative depth of the seed passage 6 below ground level G, and preferably the location of the compacting wheels 20 relative to the disc 10 is adjustable vertically. This can be by adjustment of the wheel mounting 21 relative to the support frame members 12 and in the example illustrated the mounting 21 has an upwardly extending bar 21a slidably adjustable in a socket or bracket end piece 22 secured to the rear end parts of the support frame members 12. The bar 21a and/or the end piece 22 being provided with a plurality of alignable apertures 23 and 24 through any one pair of aligned apertures 23, 24. Other suitable means can be employed for adjusting the relative heights of the compacting wheel or wheels 20 and the disc 10 for determining the depth of penetration of the disc 10 into the ground.

Each compacting wheel is preferably provided with soft rubber tyre 20a, or a low or zero pressure rubber tyre, which can perform the required slit closing and ground compacting operation without digging in, as can happen with a hard tired or hard metal rimmed wheel in soft ground, and the tires 20a on the two wheels 20 are preferably shaped or bevelled to have their inner peripheries of smaller diameter than their outer peripheries (where a single compacting wheel is provided its tire may be shaped to have a medial peripheral part of lesser diameter than the outer peripheral parts) to facilitate the slit closing operation. If desired a fixed or adjustable scraper arrangement can be mounted adjacent the tires (or tire in a single wheel arrangement) outer peripheral surface to scrape off any mud or dirt adhering thereto, and in the two or split wheel arrangement illustrated an arcuate mud guard or scraper member 25 can be mounted on the wheel mounting 21 for locating between the upper parts of the wheels 20 adjacent the inner rims.

It will be seen also that the exemplary constructions of coulter tip parts extending rearwardly and upwardly from the lower lead sharpened edge will tend to be urged downwardly into the ground as the implement is moved along, and thus a downward force is exerted on the cutting blade and compacting member, wheel or wheels, for efficient operation and to maintain the coulter tip parts and seed passage below ground level. However the invention is not confined to such a positioning or shape of the coulter tip parts and the tips or short legs 15b on coulter tip parts described with reference to FIGS. 1-4 can be substantially horizontally disposed to provide a transverse broad seed passage of minimal height. Also it is envisaged that the mounting of the coulter tip parts can be angularly adjustable to vary the height and/or form of the seed passage according to the kind of seed to be sown and/or the particular soil conditions.

Thus, it will be seen that by this invention there is provided a seed sowing implement whereby seed may be planted in a passage below ground and from which trash has been cleared or deflected and/or cut to provide freedom for growth of the seeds, and provides an arrangement whereby it is ensured that the seeds are covered and thus protected. Further, the invention provides that it is unnecessary in many cases to previously till or cultivate the ground and seed sowing operations are thus facilitated and can be speedily and economically carried out, and the preferred constructions described and illustrated are particularly adaptable and/or suited for use in areas of soils not normally regarded as suited to direct or mechanical seed sowing e.g. in very dry soil conditions and very wet soil conditions.

Particular forms of the invention have been described and illustrated by way of example, but it will be appreciated that other variations of and modifications to the invention can take place without departing from the scope of the appended claims.

I claim:

1. A seed sowing implement comprising a circular cutting blade mounted for rotation about a horizontal axis in a substantially vertically plane extending in the direction of intended travel of the blade and having a vertically disposed and substantially flat peripheral cutting edge part arranged in use to penetrate and form a vertical slit in the ground as the implement is moved forwardly along, a coulter support mounted in juxtaposition with an upper part of said blade and a pair of coulter members mounted on said support, one on each side of said blade, said coulter members being each formed from strip metal into a substantially L shape when viewed from the front or rear with a long leg extending upwardly adjacent the blade for detachable connection to its respective support and with a short leg extending laterally away from the blade to define a coulter tip part, the long leg of each coulter member being mounted in splayed relationship relative to the respective side face of the blade with at least the lower leading edge portion of each long leg connecting with the foremost portion of the tip part being arranged for sliding contact with said respective side face and said connections between the coulter members and the coulter support comprising fastening means, said fastening means permitting a limited amount of lateral movement of the coulter members relative to the cutting blade whereby forces exerted by the ground on the splayed long legs of the coulter members as the implement is moved along will constantly maintain said lower leading edge portions of such members in sliding contact with the respective blade side faces, said coulter tip parts each having a sharp leading edge and broad trailing formation projecting laterally of the line of cut of the blade and being disposed for location and operation solely below ground level at a point substantially directly below the axis of rotation of the cutting blade and above the lowest point of the cutting edge thereof so that both tip parts form a common passage extending from both sides of the ground slit and below the ground level as the implement is moved forwardly, means for determining the depth of cut of the blade and location of the coulter tip parts below ground level, and a seed duct member provided in juxtaposition with the coulter support and arranged to feed seeds from a supply source into the passage at a point close to the coulter tip parts behind the leading edge portions thereof.

2. An implement as claimed in claim 1 wherein the blade cutting edge part has a scalloped and sharp toothed outer periphery.

3. An implement as claimed in claim 1 wherein the coulter support is secured to a support for the rotatable cuting blade, said support having an upper flange part and the seed duct member extending through an upper flange part directed inwardly of the coulter support towards the respective side of the cutting blade.

4. An implement as claimed in claim 1 wherein a separate fertiliser feed duct is provided to direct fertiliser into the seed passage.

5. An implement as claimed in claim 1 wherein a pair of compacting wheels are mounted behind the blade for rotation on each side of the vertical plane of the cutting blade to close the slit in the ground over the sown seed as the implement is moved along.

6. An implement as claimed in claim 5 wherein the compacting wheels are mounted with their forward peripheral on each side of the rear peripheral part of the cutting blade.

7. An implement as claimed in claim 1 wherein a compacting means is mounted to trail behind the blade axis, coulter tip part, and seed duct member to close the slit in the ground over the sown seed as the implement is moved along.

8. An implement as claimed in claim 7 wherein the compacting member comprises at least one wheel mounted in substantially trailing alignment with the blade for rotation about a horizontal transverse axis.

9. An implement as claimed in claim 8 wherein the compacting means comprises vertical adjustment means adjustable vertically relative to the cutting blade and to serve also as the means for determining the depth of cut of the blade.

* * * * *